United States Patent [19]

Fillmore et al.

[11] 4,086,601

[45] Apr. 25, 1978

[54] SEQUENTIAL INK JET PRINTING SYSTEM WITH VARIABLE NUMBER OF GUARD DROPS

[75] Inventors: Gary L. Fillmore, Boulder, Colo.; James D. Hill, Lexington; William F. Robinson, Versailles, both of Ky.; Thomas H. Williams, Lexington, Ky.

[73] Assignee: International Business Machines Corporation, Armonk, N.Y.

[21] Appl. No.: 686,421

[22] Filed: May 24, 1976

Related U.S. Application Data

[63] Continuation-in-part of Ser. No. 671,780, Mar. 30, 1976, abandoned, which is a continuation-in-part of Ser. No. 587,464, Jun. 19, 1975, abandoned.

[51] Int. Cl.² .......... G01D 15/18

[52] U.S. Cl. .......... 346/75

[58] Field of Search .......... 346/75

[56] References Cited

U.S. PATENT DOCUMENTS

| | | | |
|---|---|---|---|
| 3,562,757 | 2/1971 | Bischoff | 346/75 X |
| 3,596,275 | 7/1971 | Sweet | 346/75 X |
| 3,828,354 | 8/1974 | Hilton | 346/75 X |
| 3,833,910 | 9/1974 | Chen | 346/75 X |
| 3,846,800 | 10/1973 | Chen | 346/75 X |

*Primary Examiner*—Joseph W. Hartary

*Attorney, Agent, or Firm*—Laurence R. Letson

[57] ABSTRACT

Insertion of guard drops on a variable basis within a drop segment of an ink jet raster has been found to be highly successful in producing quality printing. A typical sequence is PgPgPgPggPgggPPgP ← time where P designates a printed drop and g a guard drop. The drop on the right is the leading drop of the segment.

11 Claims, 10 Drawing Figures

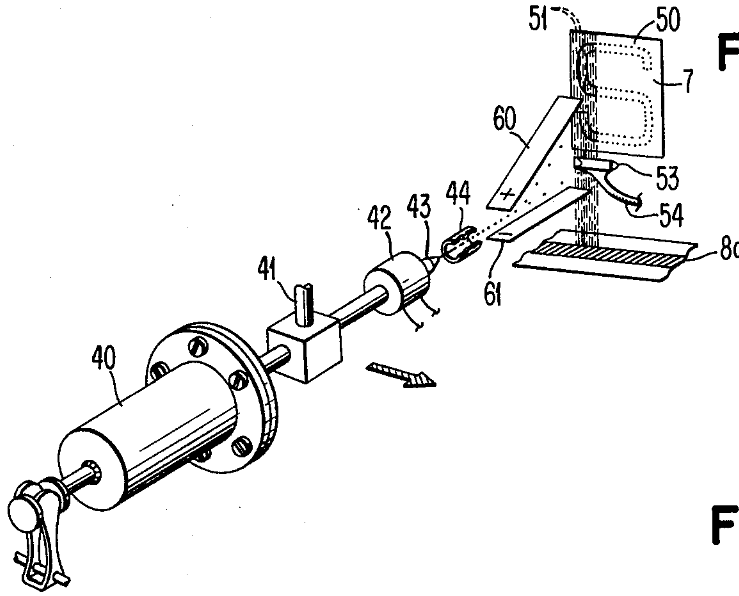
FIG. 3
FIG. 4a
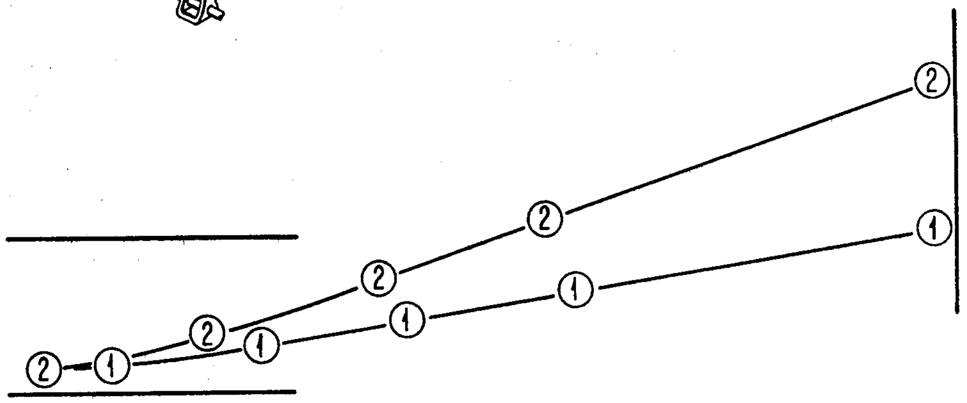
FIG. 4b
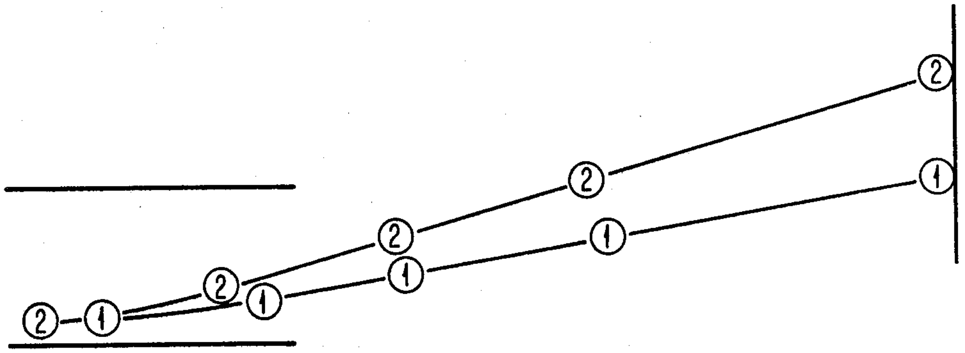
FIG. 4c
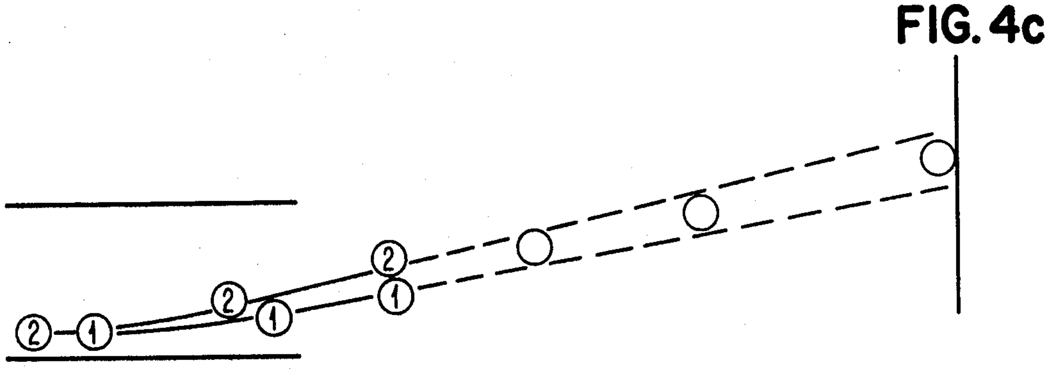

SEQUENTIAL INK JET PRINTING SYSTEM WITH VARIABLE NUMBER OF GUARD DROPS

RELATED APPLICATIONS

This application is a continuation-in-part application of Application Ser. No. 671,780, filed Mar. 30, 1976 now abandoned, of the same title which is in turn a continuation-in-part of Application Ser. No. 587,464, filed June 19, 1975, now abandoned and having the same title.

BACKGROUND OF THE INVENTION AND PRIOR ART

Representative of the prior art and background for the present invention is U.S. Pat. No. 3,562,757 having V. E. Bischoff, as inventor, and entitled "Guard Drop Technique for Ink Jet Systems". This patent describes a technique for inserting guard drops on an alternate basis between each drop to be printed. Thus, each printed drop is separated from a succeeding or preceding printed drop by a guard drop. The techniques described herein comprise a significant advance in relation to the prior art by controlling the system in order to insert guard drops on a variable basis, depending upon the positional relationships and number of printed drops in the drop sequences encountered during printing.

SUMMARY OF THE INVENTION

In a typical drop sequence in accordance with the present invention, while printing black segments, guard or gutter drops are inserted between printed drops in a 1032111 . . . pattern, referred as a "1032" pattern. That is, between the first and second drop printed in a black segment, one gutter drop is inserted, between the second and third drops, zero gutter drops, between the third and fourth, three gutter drops, between the fourth and fifth, two gutter drops—between the fifth and sixth, one gutter drop, and thereafter one gutter drop is inserted between all remaining pairs of printed drops in that black segment.

Guard or gutter drops are inserted so that a total of at least five uncharged drops fall between complete segments of printed drops. Intersegment and intrasegment guard drops are provided to accurately control the deflection of printed drops.

Guard drops are also added to white segments. Two guard drops are added for every three "white drops", to help equalize the slopes of white segments versus black segments, thereby preventing gaps in printed characters due to different scan slopes.

To minimize scan times, the scans start at a point 13 drop positions above the bottom of the character matrix box unless there is a printed portion to be marked below that position such as a serif on a lower case "*y*". Therefore there is no need to initiate the 3 white, 2 guard drop pattern below the 13 drop position unless a black segment has been printed.

In addition to the above requirements, the last printed drop of one scan is followed by at least three gutter drops before the first printed drop of the next scan.

OBJECTS

A primary object of the present invention is to produce high quality printing in an ink jet printing system with pre-established insertion of guard drops for drop segments.

Another object of the present invention is to insert guard drops on a variable basis in an ink jet printing system.

A further object of the present invention is to minimize merge-scatter problem in ink jet printing by close control of guard drop insertion, depending upon the type of drop segment, such as black segment or white segment.

An additional object of the present invention is to modify drop insertion patterns depending upon the inter-segment and intra-segment relationships.

The foregoing and other objects, features, and advantages of the invention will be apparent from the following more particular description of the preferred embodiment of the invention as illustrated in the accompanying drawings.

DRAWINGS

In the Drawings

FIG. 3 illustrates structures in the ink jet printer head assembly with associated grating.

FIGS. 4*a,* 4*b,* and 4*c* illustrate several drop trajectory relationships, sometimes encountered during ink jet printing.

Figures 5A, 5B, 5C:
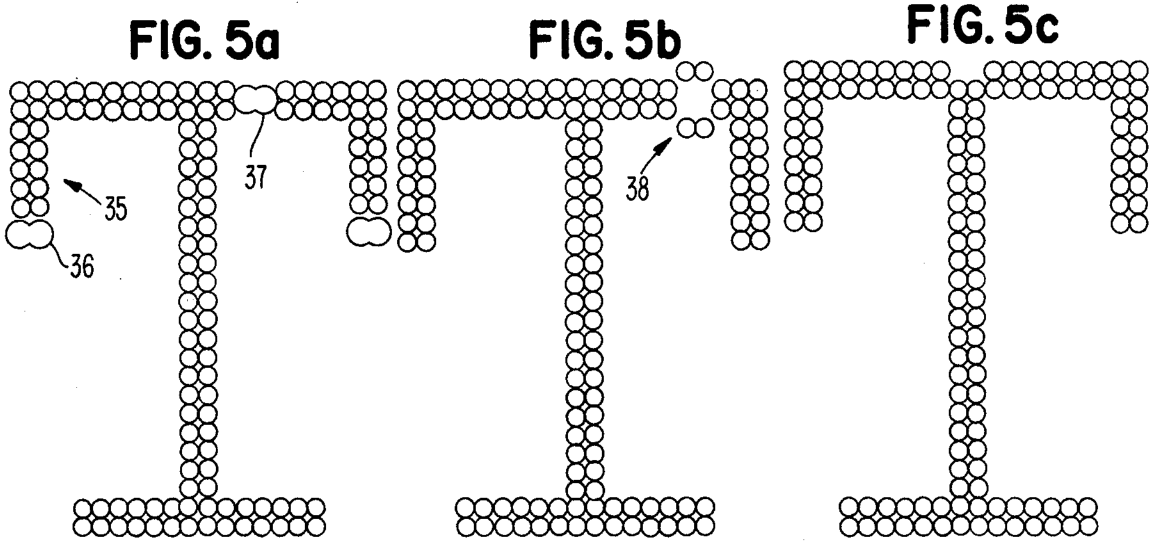

FIGS. 5*a,* 5*b,* 5*c* illustrate merging, scattering, and displacement difficulties that may be encountered during printing.

Figure 6:
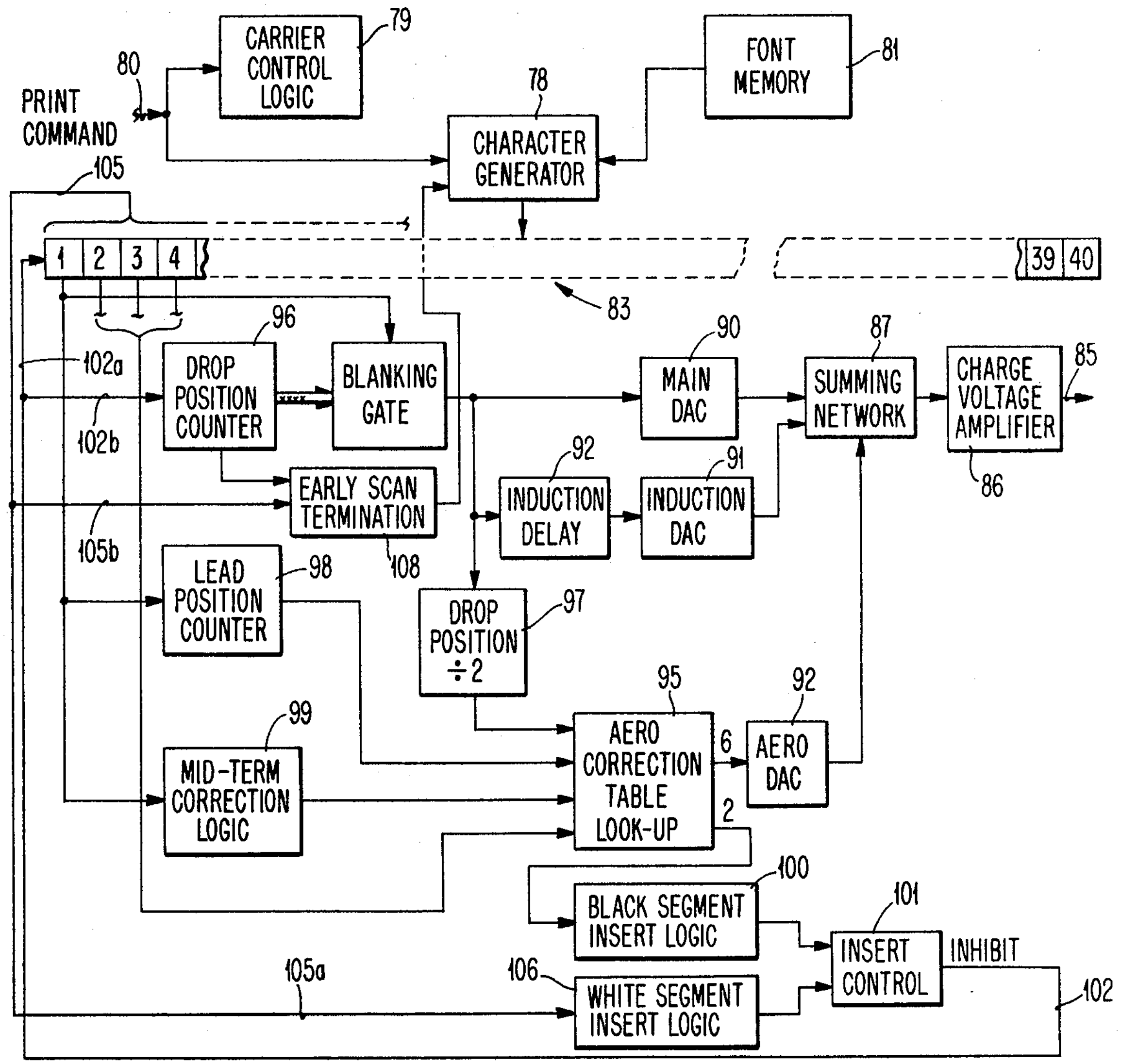

FIG. 6 is a detailed block diagram of character generation, drop charging, and drop insertion logic in accordance with the present invention.

DETAILED DESCRIPTION

System

Figure 1:
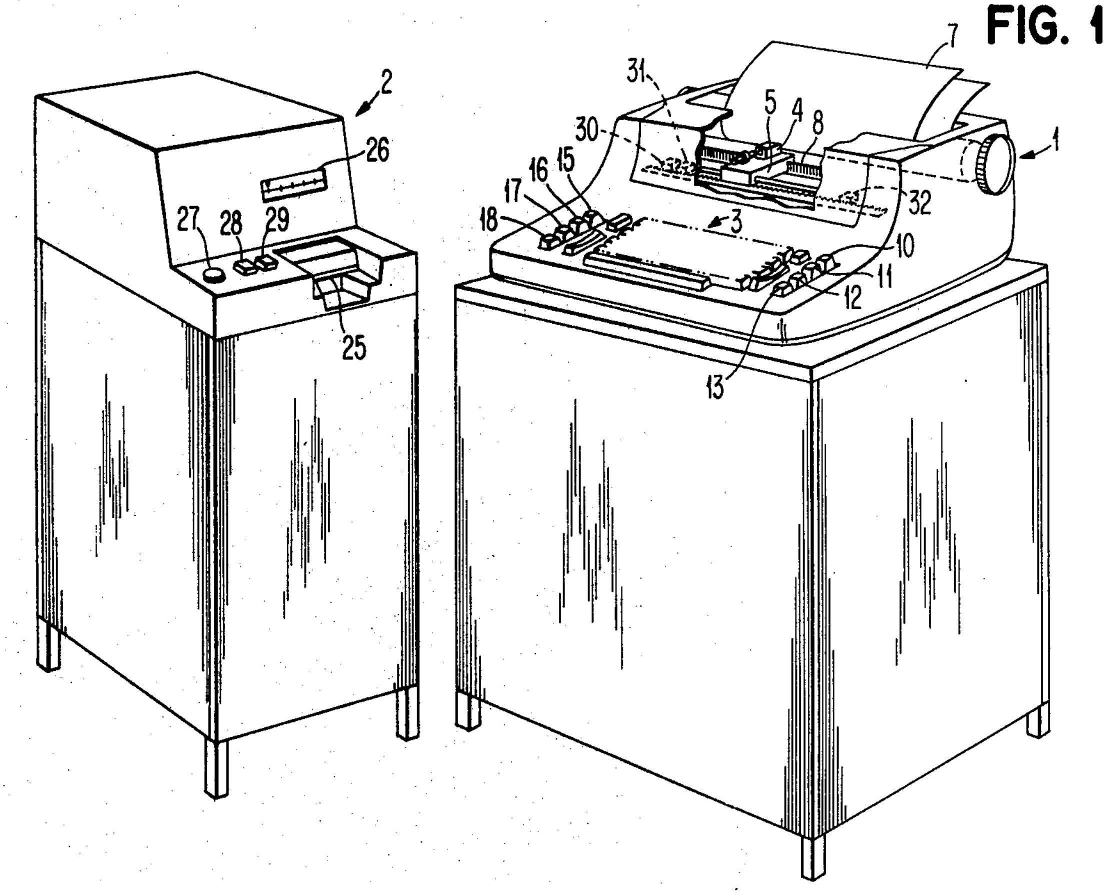
FIG. 1 illustrates an ink jet printing system having a printer and an associated magnetic card recording/reproducing unit and utilizing guard drop insertion as taught herein.

FIG. 1 illustrates an ink jet printing system incorporating a printer 1 with an associated magnetic card recording/reproducing unit 2. Card unit 2 is shown for convenience only and other kinds of storage units, recording/reproducing unit, and the like, may be used in the system. Printer 1 has the usual keyboard 3 for entry of characters into the system and control of functions. Printer 1 incorporates an ink jet head assembly 4 arranged on a carrier 5 for travelling movement from left to right and return, adjacent a document 7 to be printed. Printer 1 may be provided with various control buttons 10, 11, 12 and 13 for automatic, line, word, and character printing, respectively. Other keybuttons 15–18 concern mode selection, that is, record, playback, adjust, and skip, respectively. Printer 1 incorporates a left margin reed switch 30 and a right margin reed switch 32.

Magnetic card unit 2 has a load slot 25 and a track indicator 26. Also provided on unit 2 is a card eject button 27, a track stepdown button 28 and a track stepup button 29 for relocating the scanning transducer (not shown) with respect to the various tracks on the card.

SEQUENTIAL DROP PATTERNS WITH GUARD DROPS

Merging of drop occurs when a leading drop in a particular sequence is so slowed by aerodynamic drag that a trailing drop, encountering less drag, catches and collides thus forming one larger drop.

Scatter occurs when the repulsion forces of like charges is sufficient to deviate one or both drops from their desired trajectory.

A method of avoiding the merge or scatter problems is to increase the separation between printed drops by leaving undeflected or uncharged guard drops between the printed or charged drops. However, the tendency of printed drops to scatter and merge is not homogenous throughout a printed segment of a scan. The leading drops of a segment experience the most severe aerodynamic forces, particularly drag in the atmosphere and therefore exhibit the strongest tendency to scatter or merge. Since it takes many more guard drops to prevent scatter or merge in the leading portion of a segment, a scheme for inserting guard drops which is uniform throughout a segment is less efficient.

Figure 2:
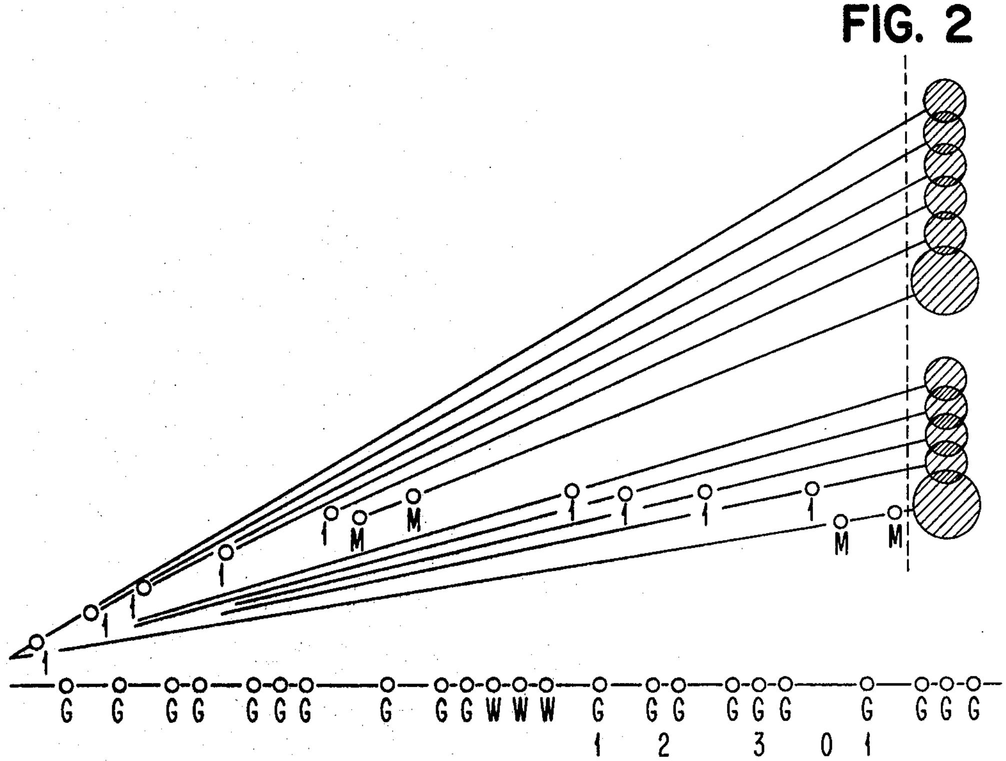
FIG. 2 illustrates a "1032" drop pattern that has been determined to produce particularly high quality printing.

The present scheme for inserting guard drops within a printed segment, illustrated in FIG. 2 and referred to as "1032" produces high quality printing:

PgPgPggPgggPPgP ← time where "P" designates a printed or charged drop and "g" a guard or uncharged drop. The drop on the right is assumed to be the leading drop of the segment. In an ascending scan each printed drop is placed one position higher in the character matrix than its predecessor, for an unbroken black segment. The only exceptions to this are the first two drops which are allowed to merge and are sent to a position intermediate between the individual positions.

To prevent the merging of the first two printed drops it is usually necessary to insert six or more guard drops. This requires too much time to prevent the slight deterioration in print quality caused by this merge. In some cases a single guard drop enhances merging, by allowing momentum to overcome repulsion forces. This is the reason for the single guard drop between the first two printed drops. This is connoted by the "1" in "1032". A merged pair is decelerated by drag much less than a single drop. For this reason the distance between the first two merged printed drops and the third printed drop increases rather than decreases and no guard drop is required; Hence the "0" in "1032". Three guard drops are required to prevent merging or scatter of the third and fourth printed drops, denoted by the "3" in "1032"; two guard drops are required between the fourth and fifth printed drops; thereby explaining the "2" in "1032"; and one guard drop is required between all remaining printed drops, because a relatively steady state condition has been arrived at by this time in a print segment. This decrease in the number of guard drops is caused by the reduction of the aerodynamic forces as the system proceeds to print a segment. For short segments the "1032" pattern of drops can be terminated after any printed drop.

If a vertical print scan contains more than one printed segment, a separation of at least five uncharged drops is necessary to prevent mutual interference of leading and trailing drops of the two segments because of the renewal of the aerodynamic drag effects or the start of the second segment. As noted, FIG. 2 is a schematic of such guard drop scheme.

For a given frequency drop generation rate the use of guard drops results in an obvious loss in throughput over the sequential scheme. This is a necessary sacrifice if one wishes to obtain high quality printing. For long segments the drop utilization efficiency is $n/2n+1$ where $n$ is the number of printed drops.

INK JET HEAD ASSEMBLY AND CHARACTER FORMATION

Referring to FIG. 3, various structures incorporated in head assembly 4 are illustrated. This includes a pump 40 for directing ink from an ink supply conduit 41 on demand as a crystal 42 is energized, that is pulsed at high frequencies. The rate of impulses to the crystal 42 may be preferably in the range of 110–120 kiloHertz, for example. Ink drops are emitted from nozzle 43 and pass through a charge electrode 44 for variable charging in accordance with the output of a charge amplifier. This charge in conjunction with the electric field generated by deflection electrodes 60, 61 acts to deflect the drops in a column an amount representing the vertical height of any given character. As illustrated the capital letter "S" designated 50 comprises a number of vertical columns 51. The printing is such that a sequence of vertical columns, each comprising a plurality of drops, such as 40 in number, is propelled from nozzle 43 toward document 7 for the printing of the character involved. If drops are not required for printing, they are directed to a gutter 53 for passage by means of a conduit 54 back to the ink supply.

The characters are formed by charging and deflecting drops to the desired location in a 40 drop high raster or scan. For a 10 pitch character, 24 such scans are used to produce a 40 × 24 drops character box. The 24 scans are produced by the horizontal motion of the carrier 5 and repeated sweeping vertically of the drops if charged. The 40 drop scans represent a vertical distance of 1/6 inch. Thus, the resolution in both the horizontal and vertical direction is 240 drops/inch. For 12 pitch characters, the character box is 20 scans wide, while the character box for proportional width characters varies from 12 to 28 scans.

FIG. 4*a* shows deflection of two drops widely separated at the paper plane indicating that there is no problem with drop placement in that case. FIG. 4*b* shows the drops placed closer together on the page, still no problem but a tendency for the drops to merge or for one to catch up to the other as indicated in the left portion of the drop trajectory.

FIG. 4*c* illustrates a case where the two drops are directed to positions adjacent or very close to one another on the page and in fact drop 2 catches up with drop 1.

FIGS. 5*a*, 5*b* and 5*c* are examples of various problems with drop placement in printed characters. In FIG. 5*a*, there are three situations where two drops have merged before striking the page and in one case, at the end of the serif 35 on the T there are two drops 36 merged that have left a gap or white space between the merged drops and the remainder of the serif. At the top of the same character, that is, the two rows of drops across the horizontal top bar on the T, two other drops have merged on two successive scans at 37. In FIG. 5*b*, the drops didn't merge but rather scattered at 38 due to repulsion effects.

FIG. 5c is a different example of improper drop placement. The horizontal bar on the T is raised one drop width with respect to the vertical section of the T and this is because of different aerodynamic interactions of long sequences of drops in a vertical bar as compared to short bursts as in a horizontal bar. Aerodynamic effects are different in a cross bar where there is a large gap of uncharged drops between the lower portion and the top portion of the T.

RULES FOR USE OF VARIABLE NUMBER OF GUARD DROPS

The following general rules apply when printing and the following rules use terms such as black or printed drop to connote a drop which impacts the paper; a guard drop to designate a drop which is inserted into the drop stream to electrostatically and aerodynamically isolate nearby drops; and white drops which are not charged but correspond to specific identifiable drop matrix positions.

1. Guard drops are inserted between print drops or as required by these rules along with white drops, and in black print segments of a scan the pattern of guard drops inserted between print drops is 1032111. . . where guard drops in the quantity of each individual digit are inserted between adjacent print drops.

2. Where a white or unprinted segment exists after a black segment has been printed in a scan, approximately 2 guard drops are inserted with each 3 white drops to maintain an appropriate slope placement parallel to a line of solid printed drops.

Slope is defined as the total drops divided by printable drops (white or black). For a long vertical bar such as in the capital T of FIG. 5 the slope would approximate $$\frac{(2(24)+1)}{24} = 2.04$$

or about 2.0. If slopes of white segments drastically deviate from 2.0 for a long time and are larger than 2.0 the drop at the next black segment is significantly displaced to the right. If the slope value is significantly less than 2.0 the next printed drops are displaced to the left leaving a potential gap where such segments meet a long vertical bar at the upper right portion of a character.

Some deviations less than 2.0 is tolerated on long segments of white to enhance throughout and provide catch up times if the drop printing should lag behind the corresponding scan position of the head. A slope of greater than 2.0 in a white segment is only possible for very short durations and is insignificant.

In the following table:

W = white drops or unprinted drop positions to be scanned g = guard drops $w+g$ must be ≧ 5 to aerodynamically and electrostatically isolate the two segments.

| W | g | W + g | Slope | $(\frac{W+g}{W})$ |
|---|---|---|---|---|
| 1 | 4 | 5 | $\frac{5}{1}$ | = (5) |
| 2 | 3 | 5 | $\frac{5}{2}$ | = (2.5) |
| 3 | 2 | 5 | $\frac{5}{3}$ | = (1.67) |
| 4 | 2 | 6 | $\frac{3}{2}$ | = (1.50) |
| 5 | 3 | 8 | $\frac{8}{5}$ | = (1.60) |
| 6 | 4 | 10 | $\frac{5}{3}$ | = (1.67) |
| 7 | 4 | 11 | $\frac{11}{7}$ | = (1.57) |
| 8 | 5 | 13 | $\frac{13}{8}$ | = (1.62) |
| 9 | 6 | 15 | $\frac{5}{3}$ | = (1.67) |
| | | etc. | | |

The rules exemplified by the above table apply to white segments except any white space below drop matrix position 13, unless a black segment of a scan has been printed below position 13. Then the insertions of guard drops in the white scan after the black segment applies even below position 13.

3. No guard drops are inserted prior to a black segment of a scan unless the black segment is initiated at a drop matrix position above position 13. This is because the scan starts at the writing line (position 13) unless some printed segment is required therebelow.

4. Not withstanding rule 3 above, there must be no less than 3 gutter drops (white or guard) between the last black segment of one scan and the first black segment of the next scan. This requirement is to isolate the last drops of one scan from the first drops of the next but only necessitates 3 drops due to the large displacement between these printed drops. The three guard or gutter drops between scans may be partially or completely satisfied by white drops of the last scan or next scan beginning if any.

5. If the last drop position printed is above drop matrix positions 32, the scan is terminated with the last printed drop.

6. A one drop segment must be separated from other printed drops in a scan by at least 4 white drops plus 2 guard drops and the single drop position may not be placed closer than 4 drop matrix positions to that of any other printed drop position in that scan.

These rules alone are not sufficient to provide high quality printing, it is still required that a charge correction be applied to each drop as it is charged to compensate for the remaining mutual electrostatic and aerodynamic forces on the drops in flight. The amount of correction to be applied to each drop is determined empirically as a function of the surrounding drop pattern (lead and lag) and its designated matrix position. These correction values are stored in a memory to be accessed as required while printing.

A complete set of data to control the drop placement requires in the order of 3000 corrections which in turn requires 12 address bits to be able to access these corrections from the memory.

These twelve address bits are derived as follows:

(a) the level above the bottom of the character box as represented by the drop position counter with the lowest order bit dropped, yielding five bits.

(b) the position of a reference drop with respect to the beginning of a segment, derived from a 3 bit lead position counter yielding three bits.

(c) pattern of lag drops, derived from the shift register yielding three bits.

and (d) and mid-term correction logic which remembers if a black segment has been printed within three drop positions yielding 1 bit of data.

LAG PATTERN

The following table illustrates the pattern of drops which will be present in different combinations following any particular drop. The combinations and an application of the rules set forth above will then dictate that known charging patterns will exist for at least that number of drops times found in the right hand column.

R is the drop being charged.

O is a white drop.

1 is a black drop.

X indicates the drop may be a black, white or guard drop.

*g* is a guard drop.

$\lambda T$ is drop times $Lg_1$, $Lg_2$, $Lg_3$, are sequential lag drop print position designations.

| | $Lg_3$ | $Lg_2$ | $Lg_1$ | | Defines Lag Time Sequence |
|---|---|---|---|---|---|
| X | 0 | 0 | 0 | R | $5\lambda T$ |
| X | 0 | 0 | 1 | R | $\geqq 6\lambda T$ |
| X | 0 | 1 | 0 | R | $11\lambda T$ |
| X | 0 | 1 | 1 | R | $\geqq 6\lambda T$ |
| g | 1 | 0 | 0 | R | $8\lambda T$ |
| g | 1 | 0 | 1 | R | $\geqq 9\lambda T$ |
| X | 1 | 1 | 0 | R | $8\lambda T$ |
| X | 1 | 1 | 1 | R | $\geqq 6\lambda T$ |

The following table illustrates the lead pattern which may exist when following the fules for a reference drop, where the reference is in an assumed position within a segment.

R is the reference drop or drop being charged. Where 1/g or 0/g is found the drop may be either a 1 or *g* or 0 or *g* respectively in all tables. X is a drop of unknown charge.

| Position of R with respect to beginning of segment | Possible Lead Patterns | Distance of Uniquely Defined Lead Pattern |
|---|---|---|
| 1st | R 0 g g g g 1 1/g 1<br>R 0 0 g g g 1 1/g<br>R 0 0 0 g g 1 1/g<br>R 0 0 0 0 g g 1<br>(same correction) | $5\lambda T$ |
| 2nd | R g 1 0 g g g g 1<br>R g 1 0 0 g g g 1<br>R g 1 0 0 0 g g 1<br>(same correction) | $7\lambda T$ |
| 3rd | R 1 g 1 0 g g g g 1<br>R 1 g 1 0 0 g g g 1<br>R 1 g 1 0 0 0 g g 1<br>(same correction) | $8\lambda T$ |
| 4th | R g g g 1 1 g 1 0 | $12\lambda T$ |
| 5th | R g g 1 g g g 1 1 g 1 0 | $15\lambda T$ |
| 6th | R g 1 g g 1 g g g 1 1 g 1 0 | $17\lambda T$ |
| 7th and > 7th (Same Correction) | R g 1 g 1 g g 1 - - - 1032<br>R g 1 g 1 g 1 g g - - 1032 | $5\lambda T$ |

The following table is a combination of the previous two tables showing all possible lead and lag patterns allowed by the fules to surround the reference drop, R, i.e. the drop being charged. Each of these patterns can occur for each designated print position of R.

| | Lag | | Lead |
|---|---|---|---|
| | | | Single drop, special case<br>First drop of segment |
| 000 | X \| O g g O O O | R | O O O g g O X |
| 001 | X O/g \| g g O O 1 g | R | O O/g O/g g g X |
| 011 | X O/g O/g \| g g O 1 1 g | R | " |
| 111 | X O/g O/g \| 1 g g g 1 1 g | R | " |
| 100 | X O/1 \| 1 g 1 g g g O O | R | " |
| 101 | X O/1 \| 1 g 1 g g g g O 1 g | R | " |
| 110 | X O/1 \| 1 g 1 g g g g O | R | " |
| 000 | | R | Second drop of segment |
| 001 | X \| g g O O O | R | g 1 O O/g O/g g g X |
| 011 | X O/g \| g g O O 1 | R | " |
| 111 | X O/g O/g \| g g O 1 g g g 1 | R | " |
| 100 | X O/g \| 1 g g 1 g g g 1 | R | " |
| 110 | O/g \| 1 g 1 g g g O O | R | " |
| 101 | X O/g \| 1 g 1 g g g g O | R | " |
| | X O/g \| 1 g 1 g g g g O 1 | | |
| 000 | | | Third drop of segment |
| 001 | X \| g g O O O | R | 1 g 1 O O/g O/g g g X |
| 011 | X O/g \| g g O O 1 g g g | R | " |
| 111 | X O/g O/g \| g O 1 g g 1 g g g | R | " |
| 100 | X O/g \| 1 g 1 g g 1 g g g | R | " |
| 110 | X O/1 \| 1 g 1 g g g O O | R | " |
| 101 | X O/1 \| 1 g 1 g g g g O | R | " |
| | X \| 1 g 1 g g g g O 1 g g g | R | " |
| 000 | | | Fourth drop of segment |
| 001 | X \| g g O O O | R | g g g 1 1 g 1 O O/g O/g g g X |
| 011 | X O/g \| g g O O 1 g g | R | " |
| 111 | X O/g O/g \| g g O 1 g 1 g g | R | " |
| 100 | X O/g \| 1 g 1 g 1 g g | R | " |
| 101 | X O/g \| 1 g 1 g g O O | R | " |
| 110 | X O/1 \| 1 g 1 g g g g O 1 g g | R | " |
| | X O/1 1 g 1 g g g g O | | |

-continued

| | Lag | | Lead |
|---|---|---|---|
| 000 | | | Fifth drop of segment |
| 001 | X gg O O O | R | g g 1 g g g 1 1 g 1 O gap |
| 011 | X O/g g g O O 1 g | R | ↓ |
| 111 | X X O/g O/g g g O 1 g O g | R | |
| 100 | X O/g 1 g 1 g 1 g | R | |
| 101 | X O/1 1 g 1 g g g O O | R | |
| 110 | X O/1 1 g 1 g g g g O 1 g | R | |
| | X O/1 1 g 1 g g g g O | | |
| 000 | Same as above | R | Sixth drop of segment |
| 001 | | R | g 1 g g 1 g g g 1 1 g 1 O gap |
| 011 | | R | ↓ |
| 111 | | R | |
| 100 | | R | |
| 110 | | R | |
| 101 | | R | |
| | | | Seventh same correction can apply from here up |
| 000 | Same as above | R | g 1 g 1 g g 1 g g g 1 1 g 1 O |
| 001 | | R | ↓ |
| 011 | | R | |
| 111 | | R | |
| 100 | | R | |
| 110/101 | | R | |
| | | R | |
| 000 | Same as above | | Eighth and above |
| 001 | | R | g 1 g 1 g 1 g g 1 g g g 1 1 g 1 O |
| 011 | | R | ↓ (1032) |
| 111 | | R | |
| 100 | | R | |
| 101 | | R | |
| 110 | | R | g 1 g 1 g 1 g 1 g g 9th |
| | | R | ↑ |
| | | R | Same to here |

LONG TERM AERODYNAMICS

Any previous segments which fall within seven drop print positions of the drop being charged will influence that drop, thus requiring compensation taking into account all seven previous drop placement positions. Since this proves very costly because of additional logic and storage costs, a compromise is accepted based on the following:

If the previous segment is within three drop placement positions then a special set of empirical corrections is used until the third drop of the new segment is charged. This set of data was derived using a two drop separation of drop positions.

If the previous segment is 4 or more drop positions away from the drop being charged, a normal set of empirical data is used to correct the charging of the reference drop. This set of data was determined using a gap of five imprinted drop positions.

By using two sets of data corrections, as above, the drop may be positioned to within acceptable limits.

CHARACTER GENERATION, DROP CHARGING, AND DROP INSERT LOGIC

FIG. 6 illustrates various logic involved in the generation of characters during printing, the establishment of correct charging voltages on the individual ink drops in order to insure proper placement on the document 7 and of particular interest in the present case, the insertion of guard drops on a variable basis in order to achieve high quality printing. The arrangements are such that the problems illustrated and discussed previously in connection with FIGS. 4*a*, 4*b* and 4*c*, as well as FIGS. 5*a*, 5*b* and 5*c* are effectively eliminated.

Character generator 78 and carrier control logic 79 receive Print Command signals on line 80 during operation of the system to effect printing of characters. Font memory 81 stores a preselected character font.

Font memory 81 actually stores a run length coding of the characters in the font plus other variables such as line weight, that is, whether two drops or three drops may be required for portions of the characters, the height of the character, scan repeat operations involving the use of multiple scans that are identical, etc.

It is noted that various drops columns of the "T" in FIGS. 5*a*–5*c* are repeatable having the same pattern in both the top and bottom override scan areas. Repeatable scans are encountered elsewhere in these characters as well as in other characters in the font memory.

Character generator 78 receives character information from font memory 81 and decompresses the information, converting it to a serial bit stream which is applied to a shift register 83, having bit positions 1–40 corresponding to the bit locations in each vertical scan during printing.

During printing, drop segments or patterns are entered by character generator 78 in shift register 83 representative of successive vertical raster scans required to produce characters. Individual drops to be printed are variably charged by an output on line 85 from charge voltage amplifier 86, the variable charge in conjunction with a constant deflection voltage, as is known in the art, resulting in placement of each drop to be printed in a particular location in a vertical sense in each column. Drops not required for printing are directed to gutter 53, FIG. 3. Also, as will be discussed, guard drops are suitably inserted in variable numbers to effectively eliminate merge and scatter problems otherwise encountered. As soon as a vertical scan pattern of drops is entered in shift register 83, under ordinary circumstances, shift register 83 would be stepped from the high order number 40 location downwardly toward the number 1 location and the individual drops 1-40 in each scan would be directed to the printed document 7 or to the gutter, as required. Thus, shift register 83 would be shifted on a regular cyclical basis in order to print drops in each vertical scan. In accordance with the present invention, however, guard drops are inserted, on a predetermined basis for each of the black and white segments encountered during printing by inhibiting the stepping of shift register 83, that is, placing it in a "wait" mode. This arrangement is such that the normal state of the art technique of shifting the register and incrementing a drop position counter once for each drop is prevented to allow guard drops to be formed between drops represented by data in the shift register 83. Whenever this occurs, guard drops are produced that are directed to gutter 53, FIG. 3, in the same manner as non-charged drops encountered during any normal scan involving positions 1-40.

The amount of charge or absence of charge provided by amplifier 86 is determined by summing network 87 having inputs from several digital to analog convertor blocks (DAC) designated 90, 91 and 92. The main DAC 90 establishes a primary voltage level within the range of voltages required for drops to be printed in each of the locations 1-40. The induction DAC 91 under control of induction delay circuit 93 provides a correction factor to summing network 87 to compensate for induction effects between successive drops in a stream. The Aero DAC 92 receives an input from the Aero Correction Table lookup 95 having empirical data stored therein that produces a correction factor on the output of Aero DAC 92 and transmits it to summing network 87. This correction factor is mainly concerned with correcting the inter-drop "wake" effects, but also produces a correction factor from Aero DAC 92 that is based on the lengths and relationships of black segments, white segments, and the inter-segment and intra-segment drop relationships.

There are alternate methods of summing (or combining) the contributions from the main, induction, and Aero conditions. Thus, a digital summation network could be employed prior to converting to an analog signal via a single DAC block.

Block 95 also provides an input on two lines for total of four states: 0, 1, 2, and 3 representative of zero guard drops, 1 guard drop, 2 guard drops, and 3 guard drops, such as those provided in the "1032" pattern, previously discussed in connection with FIG. 2. These control states are directed to the black segment insert logic 100.

Logic block 100 in turn activates insert control block 101. The output of insert control block 101 on line 102 is directed to shift register 83 at **102*a* and to drop position counter 96 on line 102*b*. The control signal on line 102 is effective to inhibit stepping of shift register 83 for an amount of time necessary to produce the exact number of guard drops required such as 1, 2, or 3 in number, or a zero guard drop condition, as determined by logic block 100. Thus shift register 83 and drop position counter 96 are effectively degated during such time. As soon as the guard drop time, which is variable, is concluded, then stepping of shift register 83 and drop position counter 96** proceeds.

It is noted that table lookup block 95 receives inputs from the "drop position divided by 2" 97, lead position counter 98 and mid-term correction logic 99, as well as inputs from drop locations 2, 3, and 4 of shift register 83 representing the charge states of drops immediately following the drop currently being printed.

A number of drop locations in shift register 83 are monitored by line 105 and directed by line **105*a* to the white segment insert logic 106 as well as by line 105*b* to early scan termination block 108. As previously discussed, under some circumstances, it is necessary that guard drops be provided even with respect to white segments. This is performed under control of logic block 106 having its output directed to insert control logic 101 that in turn inhibits shift register 83 and drop position counter 96 by line 102 (and lines 102*a* and 102*b***, respectively) in order to produce the number of guard drops required under such circumstances.

The arrangements are such that drop placement problems heretofore encountered are effectively eliminated, and the printing is of superior quality.

While the invention has been particularly shown and described with reference to a preferred embodiment, it will be understood by those skilled in the art that various changes in form and detail may be made without departing from the spirit and scope of the invention.

What is claimed is:

1. Ink jet printing apparatus having means for generating and directing ink drops toward a record medium for printing on a selective basis, comprising:

means for grouping said drops in drop printing sequences to form characters on said record medium; and drop control means for producing in each drop printing sequence a sequence of print drops and guard drops wherein a variable number of guard drops is interposed between successive pairs of print drops.

2. The apparatus of claim 1 wherein each printing sequence comprises at least first (1), second (2), third (3), fourth (4), fifth (5) and succeeding print drops and wherein:

said drop control means is operable in a "1032" mode to insert one guard drop between drops (1) and (2), no guard drops between drops (2) and (3), three guard drops between drops (3) and (4), two guard drops between drops (4) and (5) and one guard drop between each succeeding pair of drops beginning with drop (5).

3. Ink jet printing apparatus having means for generating and directing ink drops toward a record medium for printing on a selective basis, comprising:

means for grouping said drops in drop printing sequences to form characters on said record medium; and drop control means for producing in each drop printing sequence a sequence of print drops and guard drops wherein the first and second print drops are force merged and wherein a variable number of guard drops, or zero guard drops, it interposed between each successive pair of print drops.

4. The apparatus of claim 3 wherein said drop control means incorporates means for inserting a guard drop between the first and second print drops to enhance merging.

5. Ink jet printing apparatus having means for directing ink drops toward a record medium for printing on a selective basis, comprising:

means for grouping said drops in segments to form characters on said record medium; and drop control means for producing in said segments sequences of ink drops including a variable number of guard drops.

6. The apparatus of claim 5 further comprising:
insert control logic incorporated in said drop control means for controlling the variable number of guard drops to be inserted in said segments.

7. The apparatus of claim 5 further comprising:
black segment insert logic incorporated in said drop control means for controlling the number of guard drops in a black segment of drops.

8. The apparatus of claim 7 further comprising:
aerodynamics correction table look-up logic providing output signals to said black segment insert logic indicative of variable numbers of guard drops required in black segments, and
wherein said black segment logic is operable in response to said output signals to control production of guard drops in black segments.

9. The apparatus of claim 5 further comprising:
a gutter for non-print drops; and
wherein said drop control means produce sequences of print drops, continuous gutter drops and a variable number of guard drops.

10. The apparatus of claim 9 wherein said gutter drop and said guard drops are related by the ratio of about 2 guard drops for each 3 gutter drops such that for a white segment the relation of the number of gutter drops plus guard drops divided by gutter drops is about 1.5 to 2.

11. The apparatus of claim 10 which further comprises means for inserting guard drops in short white segments to cause the total uncharged drops to total five between black printed segments.

* * * * *